United States Patent [19]
Toomey, Jr.

[11] Patent Number: 5,074,974
[45] Date of Patent: Dec. 24, 1991

[54] ELECTROCHEMICAL SYNTHESIS AND SIMULTANEOUS PURIFICATION PROCESS
[75] Inventor: Joseph E. Toomey, Jr., Indianapolis, Ind.
[73] Assignee: Reilly Industries, Inc., Indianapolis, Ind.
[21] Appl. No.: 535,335
[22] Filed: Jun. 8, 1990
[51] Int. Cl.$^5$ .................................................. C25B 3/00
[52] U.S. Cl. ................................ 204/59 R; 204/182.4
[58] Field of Search ........................... 204/182.4, 59 R
[56] References Cited

U.S. PATENT DOCUMENTS

| 3,761,369 | 9/1973 | Tirrell | 204/182.4 |
| 4,133,726 | 1/1979 | Wagenknecht et al. | 204/59 R |
| 4,482,439 | 11/1984 | Toomey | 204/78 |
| 4,639,296 | 1/1987 | Cook | 204/59 R |
| 4,657,644 | 4/1987 | Bachot et al. | 204/182.4 |
| 4,732,655 | 3/1988 | Morduchowitz et al. | 204/59 R |

Primary Examiner—John Niebling
Assistant Examiner—Steven P. Marquis
Attorney, Agent, or Firm—Woodard, Emhardt, Naughton, Moriarty & McNett

[57] ABSTRACT

A process in which an electrochemical cell is used to simultaneously conduct a product synthesis and purification while also regenerating conductive material. The improved process is applied to an electrochemical synthesis which is conducted by electrolyzing a working electrolyte into which ions selectively flow, as through an ion-exchange membrane, from a counter electrolyte. The improvement comprises the step of purifying a previously electrolyzed working electrolyte by including it in or as a counter electrolyte in a subsequent synthesis.

22 Claims, No Drawings

ELECTROCHEMICAL SYNTHESIS AND SIMULTANEOUS PURIFICATION PROCESS

BACKGROUND OF THE INVENTION

This invention relates generally to electrochemistry, and more particularly to an electrochemical process achieving simultaneous product synthesis and purification as well as starting material regeneration. The invention thus holds significance across the large and growing scale of electro-syntheses both adopted and being considered for preparative scale reactions.

By way of further background, after having reached a peak in the early 1900's and thereafter having for some time received little attention in the literature and in industry, preparative scale electrochemical synthesis of organic and other chemical products is again growing in technical and commercial import. The literature demonstrates that numerous and diverse products can be formed electrochemically on a laboratory scale. However, more recent industrial attempts and literature pertaining thereto have also shown that there are many problems which must be overcome to render a scaled-up electrochemical synthesis commercially, economically and environmentally practicable.

Several noted limiting factors to the introduction of commercial electro-synthetic reactions are (1) many current large-scale syntheses are founded upon catalytic reactions for which scaling laws have been well established as compared to their electrochemical counterparts, (2) electrochemical systems scale up by area rather than by volume and are thus more costly than secular-type reactions to scale up, (3) electroorganic synthesis in aqueous electrolytes is sensitive to solubility considerations, particularly with respect to substrate solubility, and (4) organic media for electrochemical reactions frequently undergo secondary reactions, which leads to increased production costs from factors such as solvent loss and coating of electrodes. "Industrial Applications of Electroorganic Synthesis." (R. Roberts, R. P. Ouellette and P. N. Cheremisinoff), Ann Arbor Science 1982 pp. 173-174.

In addition to those above, there are many other factors which have prevented the wide scale adoption of preparative electrochemical synthesis. As those in this field will no doubt appreciate and as has also been noted in the literature, a successful electrochemical synthesis in high yield and high efficiency does not necessarily lead to a successful process from a commercial standpoint. Costs stemming from additional operations, raw materials, product and reactant recovery, and pollution and environmental effects are contributing factors of equal or greater importance than cell performance. See ibid., preface p. v. Of these factors, one which has proven particularly critical to the success or failure of a proposed electrochemical preparation is the cost associated with workup of electrolyte mediums to recover the target product. In fact, it is estimated that in most cases more than half of the total process investment is needed for the recovery operation. "Techniques of Chemistry," (N. L. Weinberg and B. V. Tilak) (1982), Vol. V, Part III, p. 279. Consequently, simplifications of product recovery operations most often have a much more pronounced effect in manufacturing cost reduction than do improvements in the cell itself.

In the face of these limiting factors, electrochemical synthesis has to this point offered great promise primarily for isolated, specialized applications in which for one reason or another, usually tied to the specific chemistries involved, the electrochemical process is commercially and environmentally feasible. For example, in a very few number of applications (about 5%), the synthesized product can be easily and inexpensively recovered because it forms a separate phase directly from the electrolyte with no further steps being necessary except possibly a simple cooling or heating cycle. One such example is where the synthesized product is gaseous at temperatures well below the boiling point of the solvent or other volatiles in the electrolyte. For instance, "Techniques of Chemistry," supra. Vol. 5, Part 3, Ch. VII pp. 6-8, describes an electrochemical preparation of fluorinated methanes which evolve from the electrolyte as a gas and are trapped as they escape.

Another situation which allows for a convenient recovery operation occurs where the product is soluble in a second phase such as an extracting solvent. As an example, Monsanto Company of St. Louis, Mo. presently operates an electrochemical process for the commercial production of adiponitrile which functions in this way. Additionally, the product in some cases is formed as a liquid which is insoluble in the electrolyte phase and thus isolation requires a simple phase separation. An example of this phenomenon is found in applicant's own U.S. Pat. No. 4,670,111 assigned to Reilly Industries, Inc. Finally, the product may be formed as a solid which is insoluble in and therefore precipitates from the electrolyte phase. An example of this phenomenon is found in the applicant's own U.S. Pat. No. 4,482,437 assigned to Reilly Industries, Inc. In one specific example, the patent describes an electro-synthesis in which 4-picolylamine sulfate product precipitates from the electrolyte.

While these and other specialized applications have represented important advancements in the field of preparative electrochemistry, equally and perhaps more important advancements are realized by discoveries which are generally applicable over a broad range of electrochemical syntheses. For example, U.S. Pat. No. 4,589,968 to Toomey describes an electrochemical cell which can be used to conduct diverse electrochemical syntheses and thus constitutes an improvement over prior art cells at the time developed and useful only for specific chemistries. Despite this and other advancements which have occurred in the field of electrochemistry, there has for some time existed a need for an improved electrochemical process which provides great advantage not only for isolated chemistries but also for a broad range of electrochemical syntheses. The applicant's invention addresses this need.

SUMMARY OF THE INVENTION

In brief summary, one preferred embodiment of this invention provides an electrochemical process in which an electrochemical cell is utilized to simultaneously perform both synthetic and product separation or purification functions while also regenerating conductive materials used for reducing cell voltages and providing solution conductivity. As an example, the applicant has achieved this by first electrochemically synthesizing (e.g. by oxidation or reduction) a product in the working electrolyte of a cell divided by a membrane which selectively exchanges ions of a first charge from the counter electrolyte into the working electrolyte. After completion of the synthesis, the electrolyzed working electrolyte containing product and increased levels of the ions is transferred to the counter electrolyte compartment of the cell, and another synthesis of product is conducted in the working electrolyte. In this manner, the electrolyzed working electrolyte transferred to the counter electrolyte will be purified by ion flow back into the new working electrolyte during the synthesis, while at the same time new product is being synthesized in the working electrolyte. Additionally, the conductive ions will thus be effectively recaptured and reused thus regenerating often expensive raw materials. Further, the subsequent synthesis in the working electrolyte can be started with a deficiency of conductive ions over that which would be required if the membrane was not purifying the counter electrolyte (i.e. previous working electrolyte).

As additional benefits, the applicant's invention provides recycle of expensive, scarce, or otherwise valuable salts used as auxiliary agents for conductivity, avoidance of a salt disposal problem, which leads to environmental benefits and disposal cost reduction, and avoidance of potentially expensive or otherwise troublesome neutralization steps. Further, advantages are provided by getting the cell to do at least two kinds of useful chemical work (e.g. one or more syntheses and purification) at the same time with nearly the same energy input as when a single type of chemical work is done (i.e. synthesis or purification alone), thus leading to increased efficiency of use of cells. Moreover, the invention provides easier isolation and purification of product since the salts would be largely separated from the medium used as the counter electrolyte, as well as recycle of valuable catalysts and avoidance of the preparation of separate counter electrolytes for each run. The applicant's invention thus squarely addresses the need for an improved and widely-applicable electrochemical synthesis technique. Additional objects and advantages of the invention will become apparent upon reading the description which follows.

DESCRIPTION OF THE PREFERRED EMBODIMENT

For the purposes of promoting an understanding of the principles of the invention, reference will now be made to a specific embodiment of the invention and specific language will be used to describe the same. It will nevertheless be understood that no limitation of the scope of the invention is thereby intended, such alterations and further modifications and applications of the principles of the invention as described herein being contemplated as would normally occur to one skilled in the art to which the invention relates.

In accordance with the above discussion, one preferred embodiment of this invention provides an improvement to an electrochemical synthesis which is conducted by electrolyzing a working electrolyte into which ions of a first charge are selectively exchanged from a counter electrolyte (e.g. through an ion exchange membrane which selectively transfers ions of the first charge). In so doing, the preferred process comprises the step of purifying the working electrolyte after the synthesis by including it in the counter electrolyte during a subsequent run or synthesis whereby the ions again selectively flow this time into the subsequent working electrolyte.

As used herein, the term "electrochemical synthesis" is meant to include both electrochemical oxidation and reduction syntheses. Electrochemical oxidation and reduction syntheses for preparation of a great variety of chemical compounds are known. For example, a good review of many such syntheses is set forth in "Technique of Electroorganic Synthesis, Parts I and II, (N.L. Weinberg, Ed.), John Wiley & Sons, New York (1974 and 1975). Further reference can be made to the applicant's own patents including U.S. Pat. No. 4,482,439 issued Nov. 13, 1984 and entitled "Electrochemical Oxidation of Pyridine Bases," U.S. Pat. No. 4,482,437 issued Nov. 13, 1984 and entitled "Electrochemical Reductions of Cyanopyridine Bases," and U.S. Pat. No. 4,670,111 issued June 2, 1987 and entitled "Electrochemical Dimerizations of Pyridinium Salts."

As a further aspect, the electrochemical synthesis to which the inventive process is applied is conducted by electrolyzing a working electrolyte into which ions of a first charge selectively flow (i.e. through an ion-exchange membrane) from a counter electrolyte. For example, an oxidation synthesis can be conducted in an electrochemical cell divided by an anion-exchange membrane. In this instance, the anolyte will be the working electrolyte, and anions will selectively flow through the membrane from the catholyte (counter electrolyte) into the anolyte. Or, alternatively, a reduction synthesis can be conducted in a cation-exchange membrane-divided cell. In this example, the catholyte will be the working electrolyte, and cations will be be selectively exchanged from the anolyte (counter electrolyte) through the membrane to the catholyte (working electrolyte).

As those practiced in this field will appreciate, the particular electrode materials selected will, of course, depend upon the particular chemistry being performed in the cell. However, for purposes of illustration, commonly used anode materials for electrochemical oxidations include for example, lead dioxide, platinum, graphite, nickel oxide, cobalt oxide and manganese oxide, and commonly used cathode materials for reductions include lead, zinc, copper, platinum black, nickel, graphite, and lead alloys. These same materials as well as others have also been known and used for counter electrodes. As noted above, however, particular electrodes and combinations thereof suitable for use in a great variety of reactions are known to those skilled in the field and are also widely reported in the literature.

Likewise, the particular solvents used, the current densities applied, and other similar factors will depend upon the particular chemistries involved and are well within the abilities of those ordinarily skilled in the field especially in light of the many types of electrochemical reactions which are known and reported in the literature. For instance, specific parameters of many syntheses are illustrated in the specific Examples and Tables which follow including identification of reactant substrates, suitable electrodes, solvents, conductive salts and current densities. These specific Examples and Tables demonstrate the application of the present invention to a broad range of chemistries and further illustrate that those practiced in this field will be able to practice the present invention with many types of electrochemical syntheses including those known and reported without undue experimentation on their part.

For example, in a typical procedure, an initial working electrolyte medium is prepared by charging the selected reactants into the working electrode compartment of the cell, along with an inorganic or organic solvent, often aqueous or partly so, and an amount of electrolyte salt, often in deficiency over what would otherwise be necessary. A counter electrolyte is prepared by adding a solvent and an amount of electrolyte salt to the counter electrode compartment, whereafter current is applied to the cell. Product is thus synthesized in the working electrode and conductive ions are transferred from the counter electrolyte through the ion-exchange membrane and into the working electrolyte causing a build-up of salt concentration therein or a neutralization.

After the electrolysis, the electrolyzed working electrolyte is transferred to the counter electrode compartment of the cell after removal of the previous counter electrolyte. A new working electrolyte is then prepared and charged similarly to the first electrolyte, and current applied again. In this manner, additional product is synthesized the working electrolyte while the counter electrolyte containing the previously synthesized product is purified by ion flow from the counter-electrolyte to the working electrolyte. As used herein, the term "purify" is intended to mean the removal of ions from a medium (e.g. at least some ions, but not necessarily all ions). For example, this removal of ions can occur by an exchange process and/or by a deprivation process. It is thus by this "purification" that the recovery of product from the medium can be significantly simplified. In this regard, it is preferred that at least about 50% of the selectively exchangeable ions are removed from the counter electrolyte containing previously synthesized product, more preferably at least about 80%. As an additional benefit, conductive ions are thus being effectively regenerated which also can reduce starting material costs and often troublesome or expensive disposal problems.

To further illustrate the invention, Examples are given below in which the applicant's inventive process is applied to preferred syntheses and purifications of 3,4-bis(p-hydroxyphenyl)-3,4-hexanediol, niacin (nicotinic acid) as well as many others. In the first-named synthesis, potassium hydroxide is used as the conductive salt initially charged both into the anolyte and catholyte compartments of a cell divided by a cation-exchange membrane. The catholyte (working electrolyte) is also charged with the reactant substrate 4-hydroxy propiophenone, 50 parts water, and 30 parts 2-butanol. Current is applied thus forming a reacted medium in the catholyte containing 3,4-bis(p-hydroxyphenyl)-3,4-hexanediol product in a concentrated potassium hydroxide solution. This reacted medium is in turn transferred to the anode (counter electrode) compartment of the cell and a new catholyte prepared and charged as above. Current is again applied whereby more product is formed in the catholyte while the product in the anolyte (counter-electrolyte) is purified by the selective transfer of potassium ions across the membrane back into the catholyte. In this manner, a full charge of potassium hydroxide to form the phenolate salt of the starting material in the working electrolyte is not needed to initiate the reduction, and a full complement of acid to neutralize the phenolate salt of the product glycol is not needed for the product isolation. Additionally, preparation of separate anolytes (working electrolytes) for each run was avoided.

In the preferred oxidative synthesis and purification of niacin, the anolyte (working electrolyte) is prepared from picoline, water and sulfuric acid. The catholyte is an anolyte of a previous run which is performed in a conventional manner. These electrolytes are pumped through a cell with a lead dioxide anode, lead cathode, and having an anion-exchange membrane while charge is passed for 185% of theoretical. In this manner, more nicotinic acid is produced in the anolyte. Additionally, the purified exiting catholyte consists of a partially precipitated nicotinic acid product which is filtered off and thereafter the filtrate is treated with a small amount of base to adjust the pH to the isoelectric point of niacin. The amount of base used in this step is only about 5% of the base which would have been needed considering all the sulfuric acid originally present in the catholyte (previous anolyte). The filtrate containing unconverted 3-picoline can then be recycled by using it in another anolyte. For example, in this way, a closed-loop recycle of all the components can be achieved, excepting small quantities lost in handling and transfer unit operations. Essentially, picoline is added to recycled electrolyte (filtrate) from the cathode compartment, thereby making it the next anolyte. Precipitated crude niacin is the only mass removed deliberately from the recycle loop. The invention thus provides significant improvements to this and other oxidations of substituted pyridine base precursors to their corresponding carboxylic acids, as well as to many other types of syntheses as discussed herein.

In general, the applicant's preferred process is most advantageously applied in situations where the product of the synthesis is not subject to substantial degradation at the particular counter electrode being used. In this regard, those in the field will be able to recognize and determine without undue experimentation or inventive effort which products fall into this category. Additionally, in many cases the counter electrode materials can be chosen or altered, and current densities and/or temperatures adjusted so as not to cause such substantial degradation. An example of such a selective process is illustrated in specific Examples 1 and 3 below, in which in Example 3 the counter electrode material nickel hydroxide/nickel oxide leads to some degradation of the product phenol being purified in the counter electrolyte, while the platinum counter electrode in Example 1 does not cause such product degradation.

In another aspect, the applicant's process is particularly favorably applied in situations where the counter-ion to the ion selectively exchanged through the ion-exchange membrane reacts at the counter electrode to form a gas (e.g. hydrogen gas in the niacin process illustrated in Example 2) which evolves from the counter electrolyte thus giving an even purer form of product in the counter electrolyte. Those in the field will also be able to recognize and appreciate which particular chemistries will achieve this result.

Additionally, particularly preferred syntheses include those in which the conductive salt which is used forms ions which are the conjugate ions of the solvent employed. For example, caustic in water forms anionic species, hydroxyl ions, which are the conjugate base of water itself. As another example, sulfuric acid in water generates the conjugate acid, protons, of the solvent. Thus, when salts are used which form the conjugate ion of the solvent, purification can be achieved by a deprivation mechanism—e.g. the counter ion of the solvent acid or base is transferred through the membrane, while the conjugate acid or base forms more solvent.

Further preferred syntheses are obtained where the inventive process is applied to "paired" electro-syntheses. In this regard, in all electrochemical processes, chemical work is performed at both electrodes; however, in most processes, one of the chemical reactions is considered "sacrificial," in the sense that the product is not desired or used—e.g., it is thrown away or otherwise never isolated and recovered. However, electrochemical cells can be operated such that the products of both the anode and cathode reactions are desired, and are thus called "paired" syntheses. As applied to such paired syntheses, the present invention provides preferred syntheses in which the cell performs three desired processes, that is, an anodic synthesis, a cathodic synthesis, and a purification of one of the electrolytes by selective ion transfer to the other. Specific Examples 23 and 24 below are representave of such paired syntheses; for their further discussion, reference can be made to M. M. Baizer in "Oganic Electrochemistry," 2nd Ed. (M. M. Baizer, H. Lund, eds.), Marcel Dekker, New York (1983) p. 1032-5.

All documents cited or referred to herein are herewith incorporated by reference in their entirety as if fully set forth.

Reference will now be made to specific examples for the purpose of further describing and understanding the features of the applicant's preferred embodiments as well as their advantages. It is understood that these examples are representative, and that such additional embodiments and improvements of the same are within the contemplation and scope of the invention as would occur to someone of ordinary skill in this art.

EXAMPLE 1

Reduction of p-Hydroxypropiophenone

A catholyte is prepared for 1 weight part of KOH, 10 parts of the propiophenone, 50 parts water, and 30 parts 2-butanol. The anolyte is the catholyte from a previous reduction. The electrolytes are pumped through a cell having a cation-exchange membrane, zinc cathode, and platinum anode. Charge is passed at 10 amps, 35 deg C., and flow rate of 1.2 1/min/cell for a total of 140% theoretical charge. As the reduction progresses, potassium ions are transferred across the membrane at essentially 100% efficiently. Yield of product by analysis was 99%. The potassium-rich catholyte is used for the next electrolysis as an anolyte where it is depleted in potassium ions, effecting a neutralization of the potassium phenolate salts formed during reduction. At the end of the next electrolysis, the purified anolyte has most of the product glycol (3,4-bis(p-hydroxyphenyl)3-4-hexanediol) in the 2-butanol layer. Separation of phases and analysis for glycol diastereomers gives 94% yield from phenone starting material. The water phase after separation of 2-butanol could be recycled to prepare another catholyte, and it is largely free of organics and salts. In this way, a full complement of bases to form the phenolate salt of the starting material is not needed to initiate reduction, and acids to neutralize the phenolate of the product glycol are not needed for product isolation. Furthermore, preparation of a separate anolyte for each run is avoided.

EXAMPLE 2

Oxidation of 3-Picoline

For an initial run, an anolyte is prepared from 4 weight parts of 3-picoline, 5 parts water and 0.1 part sulfuric acid. A catholyte is prepared in a conventional manner from sulfuric acid and water. These electrolytes are pumped through a cell with a lead dioxide anode, lead cathode, and an anion-exchange membrane. Charge is passed for 185% theoretical charge. In a second run, an anolyte (working electrolyte) is prepared in the same manner as in the initial run. The catholyte used is the anolyte from the initial run. The exiting catholyte from the second run consists of a partly precipitated nicotinic acid product which is filtered off. The filtrate is treated with base to adjust the pH to the isoelectric point of niacin (only 5% of the base is needed considering all the sulfuric acid originally present in the catholyte). The precipitated nicotinic acid is added to that already filtered off. The filtrate is reduced in volume and a third crop of product isolated. Selectivity is 94% at 88% chemical yield. The filtrate containing unconverted 3-picoline could be recycled by using it for another anolyte.

EXAMPLE 3

Example 2 is repeated, except the filtrate after the isolation of the first crop of niacin, and without adjustment to the isoelectric ph of niacin, is used in the preparation of another anolyte. An additional synthesis similar to that in Example 2 is performed and consistent satisfactory results are obtained. This closed-loop recycle process is repeated several times and similar satisfactory results are obtained for each run.

EXAMPLE 4

Comparative Example

Example 1 is repeated, except a nickel anode is used in place of the platinum anode. The yield of glycol after purification is 61% as compared to the 94% figure obtained in Example 1. The decrease in yield is a result of some glycol degradation at the anode (counter electrode) during the purification phase.

EXAMPLES 5-13

Exemplary Oxidative Syntheses

The oxidative syntheses of Table 1 are conducted using procedures analogous to that in Example 2. Accordingly, the catholytes (counter electrolytes) in the initial runs consist of the same Salt and Solvent combinations for the anolytes (working electrolytes). Successive anolytes containing the Substrate, Salt and Solvent indicated are prepared and electrolyzed in the anode compartment of the cell, and the electrolyzed anolyte mediums are then used as catholytes in successive runs. Products as indicated are accordingly satisfactorily synthesized in the anolytes and purified in the catholytes.

TABLE 1

| Ex. | Substrate | Solvent | Salt(s) | Anode | Cathode | Cur. Dens. | Product (Yield %) |
|---|---|---|---|---|---|---|---|
| 5 | phenol | methanol | NaOMe | graphite | platinum | 35 mA/cm$^2$ | p-benzoquinone, dimethyl ketal (79%) |
| 6 | 2-nitrobutane | H$_2$O | NaOH | platinum | platinum or graphite | 15 mA/cm$^2$ | 3,4-dinitro-3,4-dimethylhexane (85%) |
| 7 | furan | MeOH | KOH | graphite | graphite | 26 mA/cm$^2$ | 2,5-dimethoxy-2,5-dihydrofuran (89%) |
| 8 | gamma-picoline | H$_2$O | H$_2$SO$_4$ | lead dioxide | lead | 40 mA/cm$^2$ | iso-nicotinic acid (93%) |
| 9 | 2-methylnaphthalene | H$_2$O | H$_2$SO$_4$/Ce$^{III}$ | lead dioxide | steel | 25 mA/cm$^2$ | 2-methyl-1,4-naphthoquinone (85%) |

TABLE 1-continued

| Ex. | Substrate | Solvent | Salt(s) | Anode | Cathode | Cur. Dens. | Product (Yield %) |
|---|---|---|---|---|---|---|---|
| 10 | 1,2-cyclohexanediol | $H_2O$ | NaOH | nickel | graphite | 70 mA/cm$^2$ | adipic acid (73%) |
| 11 | cerrous oxide | $CH_3SO_3H$ | $NaO_3SCH_3$ | lead dioxide | platinum | 35 mA/cm$^2$ | cerric methane sulfaonate (90%) |
| 12 | lead monoxide | $HOAC/H_2O$ | NaOAc | lead dioxide | graphite | 50 mA/cm$^2$ | lead tetra-acetate (98%) |
| 13 | sodium bromide | $H_2O$ | (None) | platinum | platinum | 40 mA/cm$^2$ | bromine (100%) |

EXAMPLES 14 to 22

Exemplary Reductive Syntheses

The reductive syntheses summarized in Table 2 are conducted using procedures analogous to that of Example 1. Accordingly, the anolytes (counter electrolytes) in the initial runs consist of the same Salt and Solvent combinations for the catholytes (working electrolytes). Successive catholytes containing the Substrate, Salt and Solvent indicated are prepared and electrolyzed in the cathode compartment of the cell, and the electrolyzed catholyte mediums are then used as anolytes in successive runs. Products as indicated are accordingly satisfactorily synthesized in the catholytes and purified in the anolytes.

TABLE 2

| Ex. | Substrate | Solvent | Salt(s) | Anode | Cathode | Cur. Dens. | Product (Yield %) |
|---|---|---|---|---|---|---|---|
| 14 | 2,4-dibromopentane | MeOH | $Me_4N^-Br^-$ | platinum | platinum | 30 mA/cm$^2$ | 1,2-dimethylcyclopropane (98%) |
| 15 | 3-acetylpyridine | $H_2O$ | $H_2SO_4$ | lead | DSA | 10 mA/cm$^2$ | 2,3-(3-pyridyl)-butane-2,3-diol (96 %) |
| 16 | meta-nitrotoluene | $H_2O/EtOH$ | $H_2SO_4$ | copper | DSA | 39 mA/cm$^2$ | meta-toluidine (80%) |
| 17 | propionaldehyde | $H_2O$ | $NaHCO_3$ | lead | ebonex | 95 mA/cm$^2$ | 1-propanol (99%) |
| 18 | propionaldehyde | $H_2O$ | $NaHCO_3$ | tin | ebonex | 60 mA/cm$^2$ | 3,4-dihydroxyhexane (83%) |
| 19 | pyridine-4-carboxamide | $H_2O$ | $H_2SO_4$ | lead | ebonex | 20 mA/cm$^2$ | 4-pyridylcarbinol (99%) |
| 20 | pyridine-4-carbonitrile | $H_2O$ | $H_2SO_4$ | lead | DSA | 15 mA/cm$^2$ | 4-pyridinemethanamine (98%) |
| 21 | sodium hydroxide | $H_2O$ | (none) | graphite | mercury | 200 mA/cm$^2$ | Na(Hg) (100%) |
| 22 | LiCl | $NH_3$ | (none) | graphite | platinum | 135 mA/cm$^2$ | Lithium metal (100%) |

EXAMPLES 23 AND 24

Paired Syntheses

In another set of experiments, the ability to apply the inventive process to paired syntheses is demonstrated. For example, products as set forth in Table 3 below are respectively synthesized in the anode and cathode compartments of an electrochemical cell (Substrate 1 forms Product 1 in the anode, and Substrate 2 forms Product 2 in the cathode). The cell is divided by an anion-exchange membrane in Example 23, and by a cation-exchange membrane in example 24. Thereafter, the product-containing anolytes are included in subsequent catholytes, and the product-containing catholytes are included in subsequent anolytes. In this manner, two electrochemical sytheses and one purification are effectively performed at the same time thus achieving highly efficient utilization on energy, equipment and space, as well as other related advantages.

TABLE 3

| Ex. | Substr. 1 | Substr. 2 | Solvent | Salt(s) | Anode | Cathode | Cur. Dens. | Product 1 | Product 2 |
|---|---|---|---|---|---|---|---|---|---|
| 23 | beta-picoline | pyridine | $H_2O$ | $H_2SO_4$ | lead dioxide | lead | 35 mA/cm$^2$ | Niacin | Piperidine |
| 24 | NaBr | MeOH | MeOH | NaOH | platinum | platinum | 95 mA/cm$^2$ | $Br_2$ | NaOMe |

What is claimed is:

1. In an electrochemical synthesis including a step of electrolyzing a working electrolyte into which ions of a first charge are selectively exchanged from a counter electrolyte, the improvement comprising the step of purifying said electrolyzed working electrolyte by including it in the counter electrolyte of a subsequent synthesis so as to cause said ions to be selectively exchanged into the working electrolyte of the subsequent synthesis.

2. A synthesis according to claim 1, wherein said electrolyzing and purifying steps are performed several times in successive syntheses.

3. A synthesis according to claim 1, which is a paired synthesis.

4. A synthesis according to claim 1, wherein said ion of a first charge is, or is provided by a salt which forms, a conjugate ion of a solvent employed in the synthesis.

5. A synthesis according to claim 1, wherein said ion of a first charge is provided by a salt which forms a second ion which reacts in the counter electrode to form a gas.

6. A synthesis according to claim 1, wherein said purifying includes removing at least about 50% of said first charged ion from said electrolyzed working electrolyte.

7. A synthesis according to claim 6, wherein said purifying includes removing at least about 80% of said first charged ion from said electrolyzed working electrolyte.

8. A synthesis according to claim 1 in which said ions are anions, and the synthesis is an electrochemical oxidation in an anolyte of a cell divided by an anion-exchange membrane.

9. A synthesis according to claim 8, which includes an electrochemical oxidation of:
beta-picoline to niacin product;
phenol to p-benzoquinone, dimethyl ketal product;
2-nitrobutane to 3,4-dinitro-3,4-dimethylhexane product;
furan to 2,5-dimethoxy-2,5-dihydrofuran product;
gamma-picoline to iso-nicotinic acid product;
2-methylnaphthalene to 2-methylnaphthoquinone product;
1,2-cyclohexanediol to adipic acid product;
cerrous oxide to cerric methane product;
lead monoxide to lead tetra-acetate product; or
sodium bromide to bromine product.

10. A synthesis according to claim 9, and also including the step of isolating and recovering the product after said purifying.

11. A synthesis according to claim 10, wherein no substantial degradation of the product occurs during said purifying.

12. A synthesis according to claim 11, wherein said purifying includes removing at least about 50% of said first charged ion from said electrolyzed working electrolyte.

13. A synthesis according to claim 12, wherein said purifying includes removing at least about 80% of said first charged ion from said electrolyzed working electrolyte.

14. A synthesis according to claim 1 in which said ions are cations and the synthesis is an electrochemical reduction in the catholyte of a cell divided by cation-exchange membrane.

15. A synthesis according to claim 14, which includes an electrochemical reduction of:
   p-hydroxypropiophenone to 3,4-bis(p-hydroxyphenyl)-3,4-hexanediol product;
   2,4-dibromopentane to 1,2-dimethylcyclopropane product;
   3-acetylpyridine to 2,3-(3-pyridyl)-butane-2,3-diol product;
   meta-nitrotoluene to meta-toluidine product;
   propionaldehyde to 1-propanol product;
   propionaldehyde to 3,4-dihydroxyhexane product;
   pyridine-4-carboxamide to 4-pyridylcarbinol product;
   pyridine-4-carbonitrile to 4-pyridinemethanamine product;
   pyridine to picoline product;
   $Na^+$ to Na(Hg) product; or
   $Li^+$ to Li metal product.

16. A synthesis according to claim 15, and also including the step of isolating and recovering the product after said purifying.

17. A synthesis according to claim 16, wherein no substantial degradation of the product occurs during said purifying.

18. A synthesis according to claim 17, wherein said purifying includes removing at least about 50% of said first charged ion from said electrolyzed working electrolyte.

19. A synthesis according to claim 18, wherein said purifying includes removing at least about 80% of said first charged ion from said electrolyzed working electrolyte.

20. An electrochemical synthesis and purification, comprising the steps of:
   electrochemically synthesizing a product in a medium in the working electrode compartment of an electrochemical cell, during which ions of a first charge are selectively exchanged from a counter electrode compartment into said medium;
   after said synthesizing, transferring said medium into said counter electrolyte compartment; and
   electrochemically synthesizing additional of said product in said working electrode compartment, during which said selective ion exchange again occurs, so as to purify said medium in said counter electrode compartment.

21. A synthesis according to claim 20, which includes an electrochemical oxidation of:
   beta-picoline to niacin product;
   phenol to p-benzoquinone, dimethyl ketal product;
   2-nitrobutane to 3,4-dinitro-3,4-dimethylhexane product;
   furan to 2,5-dimethoxy-2,5-dihydrofuran product;
   gamma-picoline to iso-nicotinic acid product;
   2-methylnaphthalene to 2-methylnaphthoquinone product;
   1,2-cyclohexanediol to adipic acid product;
   cerrous oxide to cerric methane product;
   lead monoxide to lead tetra-acetate product; or
   bromide to bromine product.

22. A synthesis according to claim 20, which includes an electrochemical reduction of:
   p-hydroxypropiophenone to 3,4-bis(p-hydroxyphenyl)-3,4-hexanediol product;
   2,4-dibromopentane to 1,2-dimethylcyclopropane product;
   3-acetylpyridine to 2,3-(3-pyridyl)-butane-2,3-diol product;
   meta-nitrotoluene to meta-toluidine product;
   propionaldehyde to 1-propanol product;
   propionaldehyde to 3,4-dihydroxyhexane product;
   pyridine-4-carboxamide to 4-pyridylcarbinol product;
   pyridine-4-carbonitrile to 4-pyridinemethanamine product;
   pyridine to picoline product;
   $Na^+$ to Na(Hg) product; or
   $Li^+$ to Li metal product.

* * * * *